United States Patent [19]

Kita et al.

[11] Patent Number: 5,123,244

[45] Date of Patent: Jun. 23, 1992

[54] DIFFERENTIAL PRESSURE MEASURING DEVICE WITH POSITION DETECTOR MEANS

[75] Inventors: Yasuo Kita; Yoshihiko Nakakoji, both of Kyoto, Japan

[73] Assignee: Shimadzu Corporation, Kyoto, Japan

[21] Appl. No.: 511,918

[22] Filed: Apr. 16, 1990

Related U.S. Application Data

[63] Continuation of Ser. No. 160,937, Feb. 26, 1988, abandoned.

[30] Foreign Application Priority Data

Feb. 28, 1987 [JP] Japan .................. 62-46409

[51] Int. Cl.⁵ .................. F16D 31/02
[52] U.S. Cl. .................. 60/452; 60/328
[58] Field of Search .......... 60/443, 444, 445, 452, 60/487, 488, 490, 328; 73/745, 746

[56] References Cited

U.S. PATENT DOCUMENTS

| | | | |
|---|---|---|---|
| 1,227,639 | 5/1917 | Manly | 60/328 X |
| 3,901,031 | 8/1975 | Knapp et al. | 60/444 X |
| 4,050,247 | 9/1977 | Connett | 60/444 |
| 4,167,855 | 9/1979 | Knapp | 60/487 X |
| 4,211,079 | 7/1980 | Saele et al. | 60/444 X |
| 4,246,934 | 1/1981 | Budzich | 60/452 X |
| 4,279,162 | 7/1981 | Neill et al. | 73/746 |
| 4,282,711 | 8/1981 | Branstetter | 60/444 X |
| 4,476,680 | 10/1984 | Pollman et al. | 60/443 X |
| 4,528,813 | 7/1985 | Izumi et al. | 60/444 X |
| 4,742,677 | 5/1988 | Kuchenbecker | 60/443 |
| 4,759,185 | 7/1988 | McConnell et al. | 60/444 |
| 4,802,336 | 2/1989 | Mayr et al. | 60/443 X |
| 4,858,651 | 8/1989 | Koiwai et al. | 60/452 X |
| 4,947,732 | 8/1990 | Hidenobu | 73/745 X |

FOREIGN PATENT DOCUMENTS

| | | |
|---|---|---|
| 2022787 | 12/1979 | European Pat. Off. |
| 2087050 | 5/1982 | European Pat. Off. |
| 2270114 | 12/1975 | France |
| 50462 | 4/1977 | Japan ........ 60/444 |

Primary Examiner—Edward K. Look
Assistant Examiner—John Ryznic
Attorney, Agent, or Firm—Armstrong, Nikaido, Marmelstein, Kubovcik & Murray

[57] ABSTRACT

A hydrostatic transmission with a pair of pump/motor connected in a closed loop state by a pair of hydrostatic circuit. The hydrostatic transmission comprises a differential pressure detecting means which detects the differential pressure between the circuits and a displacement correcting means which, in case an operation to establish a neutral status has been carried out, controls the displacement volume of the pump/motor on the side where the pumping action is carried out toward a direction in which the magnitude of this differential pressure is held within a set range.

In case the set range is set to a value with which a vehicle cannot run, the phenomenon of creep running will not occur.

1 Claim, 2 Drawing Sheets

DIFFERENTIAL PRESSURE MEASURING DEVICE WITH POSITION DETECTOR MEANS

This application is a continuation of application Ser. No. 160,937 filed Feb. 26, 1988 now abandoned.

BRIEF SUMMARY OF THE INVENTION

This invention relates to a hydrostatic transmission which is used preferably, as an infinitely variable speed change gear and the like for vehicles.

As a hydrostatic transmission of this type, there has been known to those skilled in the art a hydrostatic transmission wherein a pair of pump/motor is connected in advance in a closed loop state by means of a pair of hydrostatic circuit, one pump/motor is driven by a prime mover thereby to cause the pumping action to be carried out, the other pump/motor is caused to operate by the hydrostatic pressure discharged from the pump/motor, so that wheels and the like can be driven by the rotational output of the other pump/motor.

Thus, in a transmission of this type, generally a pump/motor which at least carries out a pumping action is made to be a variable capacity type so that it is made possible to change suitably the transmission gear ratio by adjusting the displacement of the pump/motor.

Thus, in a hydrostatic transmission such as this, it is possible to obtain a neutral status by making zero of the displacement of the pump/motor which carries out the pumping action. However, when a transmission such as this is used for driving vehicles, the pump/motor on the side of pump is generally rotated and driven at a high speed by a prime mover such as an internal combustion engine. Therefore, if there should exist a very small error in the amount of eccentricity of cylinder blocks or the inclination of swash plates for controlling the displacement, it results in that the pressurised liquid will be discharged from the pump/motor. For this reason, even if a hydraulic transmission is set in a neutral status with an intention to do so, the pump/motor on the motor side will operate and what is called the "creep running" will result.

As a means of preventing a defect such as this, there has been developed a hydraulic transmission in which the check valve for boosting in neutral status is forcibly caused to open or one in which a special neutral valve is provided and the pressurized liquid is introduced into a tank by means of a choke when the hydraulic output is small, so that the hydraulic transmission is caused to shift into a running operation by closing the neutral valve when the hydraulic output has exceeded a set value. However, since the hydraulic transmissions of these type involve discontinuous shifting from a neutral to running operation, the smoothness in operation will be impaired. In addition, because the energy is also consumed even in a neutral state of a hydraulic transmission which is provided with a neutral valve, economic performance thereof becomes a hard point to settle.

For this reason, a hydraulic transmission may be considered in which the yawing moment such for example for the inclination of the pump/motor is strengthened to reduce the error in neutral state so as to eliminate the aforementioned discontinuity or the wasteful use of energy. In, a hydraulic transmission as described above, it requires a large force for tilting operation of the swash plate and the like during general operations.

An object of the present invention is to solve all of such problems as stated above.

In order to achieve the objects such as above, the present invention is designed to adopt the following constructions.

That is to say, in a hydraulic transmission according to the present invention in which a pair of pump/motor is connected in a state of a closed loop by means of a pair of hydraulic circuit, the hydraulic transmission comprises a differential pressure detecting means which detects the differential pressure between the aforementioned hydraulic circuits and a displacement correcting means which, in case an operation to establish a neutral status has been carried out, controls the displacement volume of the pump/motor on the side where the pumping action is carried out toward a direction in which the magnitude of this differential pressure is held within a set range.

In case pressurized liquid is discharged due to an operational error, from a pump/motor whose displacement volume should have been reduced to zero by an operation which should establish a neutral status, there is generated a differential pressure between both hydraulic circuits. If in case the differential pressure should exceed a set value, such condition is detected by the differential pressure detecting means and the displacement volume of the pump/motor which discharges the pressurized liquid due to the operation of the displacement correcting means is controlled in such a direction that the differential pressure is held within a set range.

Therefore, if the set value is set to a value with which a vehicle cannot run, the phenomenon of creep running will not occur.

Further, if the differential pressure between the hydraulic circuits is controlled to almost zero, the pressure of the whole hydraulic circuits becomes equal to the boosting pressure. Therefore, it becomes possible to keep the leaking amount of the working liquid in the pump/motor to a minimum.

Because the present invention is structured as described above, it is possible to establish a precise neutral state without using any equipment such as the position detector of high accuracy, it is also possible to prevent the creep running of a vehicle and to accomplish energy efficient operation, and further, it is possible to carry out smooth shifting from the neutral state to the running state, and the present invention is capable of providing an excellent hydraulic transmission in which no faulty condition is involved to cause adverse influence upon the operating performance of the pump/motor due to increased operating force.

BRIEF DESCRIPTION OF THE DRAWINGS

FIG. 1 is an explanatory drawing of the circuits,

FIG. 2 is a cross sectional view showing the differential pressure detecting means, FIG. 3 is a cross sectional view of the line III—III in FIG. 2.

DETAILED DESCRIPTION OF THE INVENTION

Figure 1:
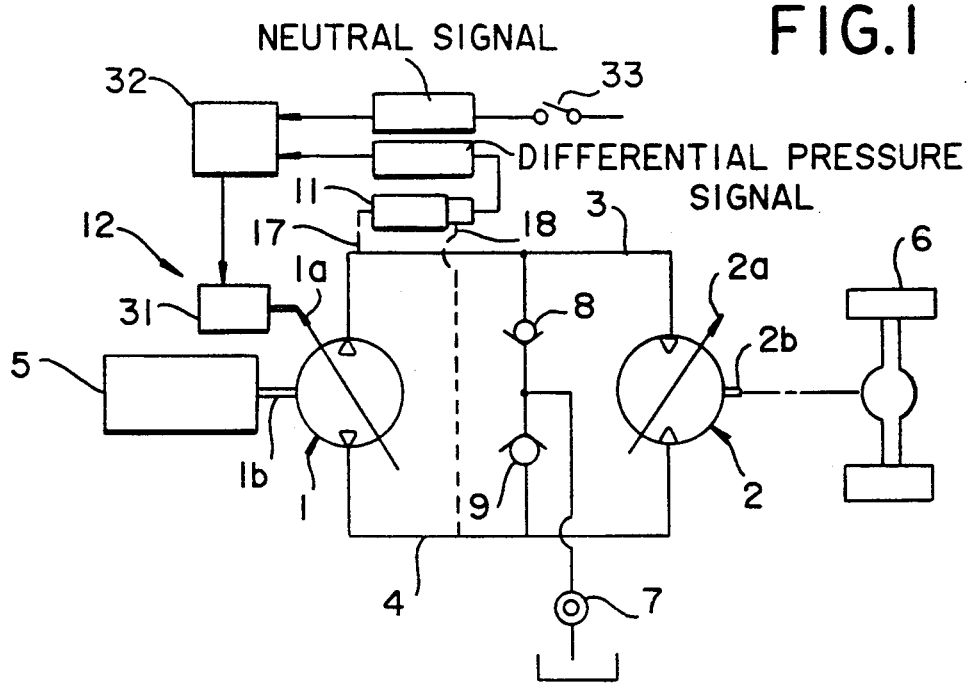
FIG. 1 through FIG. 3 show an embodiment of the present invention.

An embodiment of the present invention will hereinafter be described by referring to FIG. 1 through FIG. 3.

A pair of pump/motor 1, 2 is connected in a closed loop state to a pair of hydraulic circuits 3, 4. By variably operating the operating input terminal 1a, 2a and by adjusting the amount of eccentricity of the cylinder block or the angle of the swash plate and the like, each pump/motor 1, 2 is made a variable capacity type structured so as to change the displacement volume thereof to an infinitely variable range. In addition, the prime mover 5 is connected to the rotating shaft 1b of one pump/motor 1 and the rotating shaft 2b of the other pump/motor is connected to the driving wheel 6 of a vehicle. A component 7 is a boost pump which is connected to the aforementioned hydraulic circuits 3, 4 by means of the check valves 8, 9.

Furthermore, the differential pressure detecting means 11 and the displacement correcting means 12 are provided with this hydraulic transmission.

Figure 2:
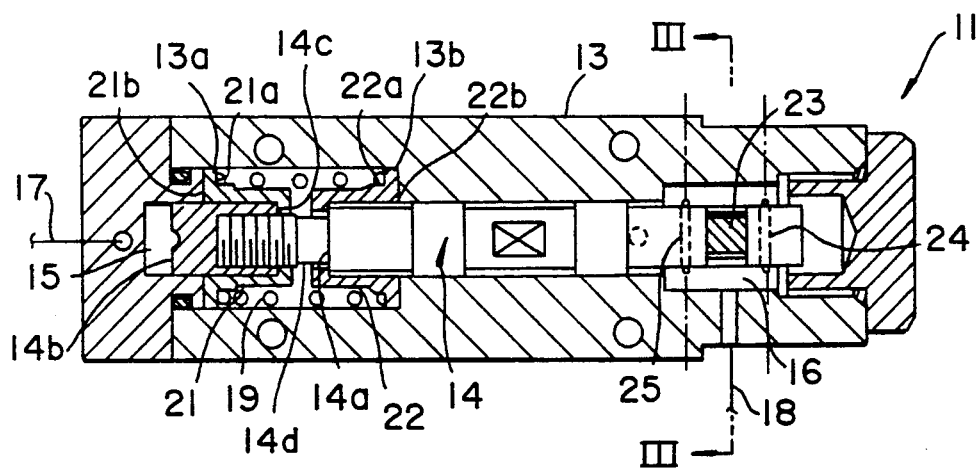
Figure 3:
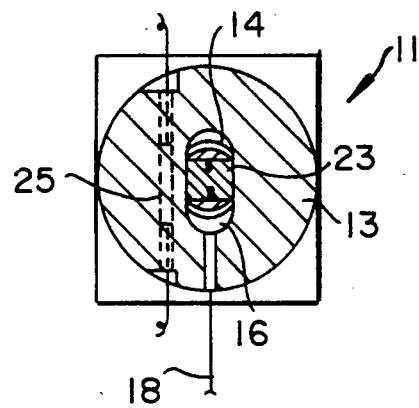

As shown in FIG. 2 and FIG. 3, in the differential pressure detecting means 11, the differential pressure spool 14 is freely slidably fitted into the housing 13 in the direction of the shaft center and the pressure chambers 15, 16 are formed in the internal portion of both ends of the aforementioned housing 13. Both pressure chambers 15, 16 are mutually isolated by means of the differential pressure spool, one pressure chamber 15 is connected to one hydraulic circuit 3 by means of the passage 17, and the other pressure chamber 16 is connected to the other hydraulic circuit 4 by means of the passage 18. And, this differential pressure spool 14 is held at the neutral position by the spring force of the center spring 19. That is to say, in the neighborhood of one end of the differential pressure spool 14, the minor diameter 14d is caused to be positioned and formed between the stepped end face 14a and the end face 14c of the cap nut 14b, and the cup-shaped slider 21, 22 which is made a pair with respect to this minor diameter 14d is caused to be fitted slidably and outwardly. In addition, the flange 21a, 22a is provided on the outer circumference of the open end portion of the sliders 21, 22 and the aforementioned center spring 19 is interposed between these flanges 21a, 22a. The center spring 19 is a compression coil spring and provides a spring force in a direction in which the aforementioned sliders 21, 22 are caused to separate each from the other. Furthermore, the open end face 21b, 22b of both sliders 21, 22 is caused to be detachably engaged with the engaging surface 13a, 13b provided on the housing 13. In the neighborhood of the other end of the differential pressure spool 14, the permanent magnet 23 is provided. At a position adjacent to the aforementioned permanent magnet 23 of the housing 13, a pair of lead switch 24, 25 are embedded. When the differential pressure spool 14 is held at the neutral position, both lead switches 24, 25 are in OFF state, but when the differential pressure spool 14 has slidden to the right direction in the diagram, one lead switch 24 detects magnetism and becomes in ON state, and when the differential pressure spool 14 has slidden to the left direction in the diagram, the other lead switch 25 detects the magnetism and is caused to change to ON state.

On the other hand, the displacement correcting means 12 comprises the actuator 31 which variably operates the operating input terminal 1a of the aforementioned pump/motor so as to adjust the displacement volume thereof and the controller 32 which controls this actuator 31. When an operation which is to set a transmission into neutral state has been carried out (i.e., when a signal is inputted from the neutral position) detecting switch 33 which is changed over when the operating lever for operating the transmission gear ratio has been set at the neutral position, the controller 32 checks ON or OFF state of the aforementioned two reed leads switches 24, 25. When one reed switch is in ON state, the aforementioned actuator 31 is caused to operate in one direction to correct the displacement volume of the pump/motor 1 into negative direction, and when the other lead switch 25 is in ON state, the aforementioned actuator 31 is caused to operate in the other direction so that it is possible to correct the displacement volume of the pump/motor 1 into positive direction. However, this controller may be composed with a dedicated electronic circuit or with a general purpose microcomputer.

Incidentally, the control of the displacement volume carried out during ordinary operation when the signal requiring the neutral state is not inputted into the controller 32 is quite the same as that of general transmission, description thereof is omitted here.

Next, operations of this embodiment will be described. When an operator has operated to establish a neutral state of a transmission, a neutral signal is inputted into the controller 32 from the neutral position detecting switch 33, and ON or OFF state of the two reed switches 24, 25 which becomes the differential pressure signal is taken into the controller 32. When the displacement volume of the pump/motor 1 is shifted to the positive direction beyond the zero position even if the operator has accomplished the neutral operation, pressurized liquid is discharged from the pump/motor 1 to one hydraulic circuit 3. As a result of this, the pressure in one hydraulic circuit 3 becomes higher than the pressure of the other hydraulic circuit 4. When the differential pressure between the two hydraulic circuits has exceeded a set value defined by the center spring 19, one slider 21 is being caused to separate from the engaging surface 13a and the differential spool 14 slides toward the right direction in the diagram, and one reed switch 24 is changed over to ON state.

When the signal is inputted into the controller 32, an operating signal is outputted from this controller 32 to the actuator 31, and the displacement volume of the aforementioned pump/motor is corrected into the negative direction. When the magnitude of the differential pressure between the aforementioned hydraulic circuits 3, 4 is reduced below a set value as a result of the operation of above, the aforementioned differential pressure spool 14 is returned to the original neutral position by the spring force of the neutral spring 19 and the correction of the displacement volume is caused to stop. Conversely, when the displacement volume of the aforementioned pump/motor 1 has shifted toward the negative direction and the pressure of the other hydraulic circuit 4 has become higher than the pressure of one hydraulic circuit 3 and further the absolute value of the differential pressure thereof has exceeded the set value, the aforementioned differential pressure spool 14 slides toward the left direction in the diagram, and the other reed switch 25 is changed over to ON state. When the signal is inputted into the controller 32, an operating signal is outputted toward the actuator 31 from this controller 32, and the displacement volume of the aforementioned pump/motor 1 is corrected toward the positive direction. When the absolute value of the differential pressure between the aforementioned hydraulic circuits 3, 4 has reduced below the set value as a result of the operation of above, the aforementioned differential pressure spool 14 is returned to the original position by the spring force of the neutral spring 19 and the displacement volume is stopped of correction.

Further, in a transmission such as above, when an operation to set up a neutral state, the displacement volume of the pump/motor 1 will be corrected so that the differential pressure between the hydraulic circuits 3, 4 becomes a value within a prescribed set range. Therefore, if the aforementioned set value is set to an appropriate value in advance, a precise neutral state can be obtained without causing the aforementioned creep running and the like even if an error occurs during the initial neutral operation.

Furthermore, in a transmission such as this, it is arranged to obtain the neutral state by controlling to almost zero of the displacement volume of the pump/motor 1 which accomplishes the pumping action. Therefore, it is possible to reduce reasonably the leakage inside of the pump/motor 1, 2 and to minimize the consumed power during neutral state thereby accomplishing energy efficient operation.

Because the transmission such as above is designed to control the displacement volume to zero during the neutral operation with respect to the pump/motor 1, while shifting to ordinary running, it is only necessary to change the displacement volume thereof from the position thereof, and no efforts such as changing over of a circuit becomes necessary at all. For this reason, it is possible to accomplish a smooth starting.

Furthermore, a hydraulic transmission according to the present invention is made possible to accomplish a more simple and positive control as compared with a transmission in which, for example, the amount of eccentricity of the cylinder block or the inclination of the swash plate and the like is detected so as to control the displacement volume to zero. In other words, when the hydraulic output of the pump/motor 1 exceeds the internal leakage amount of the working liquid, the differential pressure between both hydraulic circuits 3, 4 shall have theoretically become infinite. Therefore, if only whether the pump/motor 1 is set to the neutral position by the differential pressure of the hydraulic circuits 3, 4 is detected, and as compared to with the case in which the actual amount of eccentricty or the actual angle of the swash plate is detected, it is possible to know more positively that an error exists at the neutral position of the pump/motor 1 and an equipment such as the position detector of high resolution will become unnecessary.

Furthermore, if an arrangement such as above is designed, there is no need for increasing the yawing moment of the pump/motor, and therefore, there is such problem that the operating performance becomes deteriorated in an operating range other than the neutral position.

Figure 4:
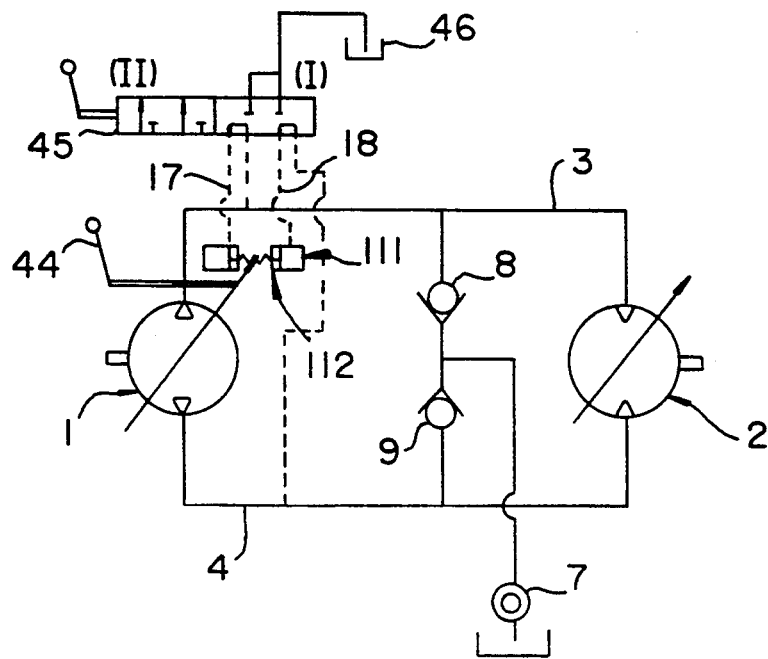
FIG. 4 is an explanatory drawing of the circuits of another embodiment of the present invention.
Figure 5:
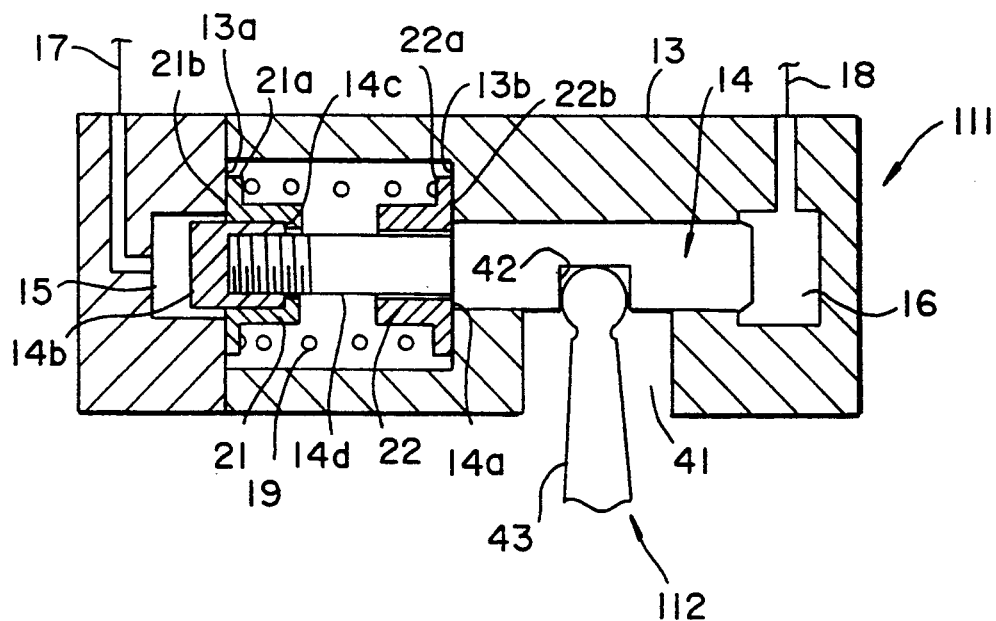
FIG. 5 is a schematic cross sectional view showing the differential pressure detecting means in the same embodiment.

Incidentally, in the above embodiment, the case is explained in which a hydraulic transmission is designed to use the actuator of a motor and the like so as to correct the displacement volume of a pump/motor, but the present invention will not apparently be limited to such an embodiment but may be one which is shown in FIG. 4 and FIG. 5. That is to say, the differential pressure detecting means 111 of this embodiment has a structure in which the lead switch 24, 25 are removed from the differential pressure detecting means 111 of the aforementioned embodiment, and therefore, the portion which is the same or equivalent to that of the aforementioned embodiment is assigned with the same symbols and the description thereof is omitted here. Thus, the differential pressure detecting means 111 has a function which only converts the differential pressure between the hydraulic circuits 3, 4 into a mechanical displacement of the differential pressure spool 14. And further, in the displacement volume correcting means 112 of this embodiment, the opening section 41 is provided with the aforementioned housing 13, the connection recess section 42 facing the aforementioned opening section 41 of the aforementioned differential pressure spool 14, at this connection recess section 42, the tip of the eccentric control lever 43 which is connected to the operating input terminal 1a of the aforementioned pump/motor 1 is rotatably engaged, so that the aforementioned eccentric control lever 43 is movably operated by the sliding action of the aforementioned differential pressure spool 14 thereby adjusting the displacement volume of the pump/motor 1. And, on this eccentric control lever 43, the operating section 44 for adjusting the displacement volume of the aforementioned pump/motor 1 during ordinary running, and each of the pressure chamber 15, 16 of the aforementioned differential pressure detecting means 15, 16 is caused to be connected to each of the hydraulic circuits 3, 4 or the tank 46 by means of the change-over valve 45. That is to say, when this change-over valve 45 is held at the neutral position I, each of the aforementioned pressure chambers 15, 16 is connected to a corresponding hydraulic circuit 3, 4, and if the changer-over valve 45 is changed from the neutral position I to the running position II, each of the aforementioned pressure chamber 15, 16 will be connected to the tank 46.

In a hydraulic transmission of the arrangement such as above, when the change-over valve 45 is held at the neutral position I and the operation for the operating section 44 is discontinued, then this hydrauric transmission becomes in the neutral state. Under such conditions, if the aforementioned eccentric control lever 43 is not returned to a position where the displacement volume can be made to zero exactly, there occurs the differential pressure between the aforementioned hdyraulic circuits 3, 4. And if the magnitude of the differential pressure exceeds the set value, the differential pressure spool 14 slides, causing the aforementioned eccentric control lever 43 to be displaced in a direction to reduce the differential pressure. In a manner such as above, the differential pressure between the two hydraulic circuits 3, 4 is controlled to almost zero. When the vehicle is running, the change-over valve 45 is changed to the running position II to free the differential pressure spool 14, the operating section 44 of the eccentric operation lever 43 is operated and the displacement volume of the pump/motor 1 is adjusted appropriately.

In the above embodiment, a hydraulic transmission of what is called the HST type is described in which the power is transmitted by using only a pair of pump/motor, however, it shall not be understood that the present invention is limited only to such type of hydraulic transmission but it is apparent that the present invention can be applied to the hydraulic transmission of what is called the HMT type in which, for example, a pair of pump/motor is combined with a differential gearing mechanism, so that the power transmission from the input terminal to the output terminal is caused to be shared by the fluid type transmission system by means of a pump/motor and the mechanical type transmission system by means of gears.

While the invention has been particularly shown and described in reference to preferred embodiments thereof, it will be understood by those skilled in the art that changes in form and details may be made therein without departing from the spirit and scope of the invention.

What is claimed is:

1. A differential pressure measuring device for indicating a differential pressure between two portions of a hydrostatic circuit, comprising:

a housing;

a spool axially shiftable within said housing wherein opposing pressure chambers are formed by said spool and said housing, wherein each of said pressure chambers is coupled to one portion of the hydrostatic circuit, such that a differential pressure between said chambers causes said spool to shift in the axial direction;

a pair of opposing engagement faces formed in said housing;

biasing means for maintaining said spool in a neutral position, including,
   (a) a pair of opposing slidable members, each slidable member having a first surface engageable with respective opposing engagement faces of said housing, and each slidable member having a second surface engageable with a respective step on said spool, and
   (b) a spring member disposed between said slidable members, for biasing said slidable members toward respective opposing engagement faces of said housing; and a position detector means for outputting an electric signal corresponding to movement of said spool against said biasing means and in response to the differential pressure.

* * * * *